United States Patent [19]

Smith

[11] 3,951,804
[45] Apr. 20, 1976

[54] AERATED SEWERAGE DISPOSAL

[76] Inventor: Alvin Jack Smith, 22 Cordova Drive, Santa Barbara, Calif. 93110

[22] Filed: Aug. 5, 1974

[21] Appl. No.: 495,053

Related U.S. Application Data

[63] Continuation of Ser. No. 335,029, Feb. 23, 1973, abandoned.

[52] U.S. Cl. .................. 210/170; 210/195 R; 210/197; 210/202; 210/205; 210/532 S
[51] Int. Cl.² .................................. C02C 1/08
[58] Field of Search ............ 210/15, 16, 170, 195, 210/197, 202, 219, 220, 532 S, 205; 261/87

[56] References Cited
UNITED STATES PATENTS

| | | | |
|---|---|---|---|
| 1,900,809 | 3/1933 | Hammerly | 210/219 |
| 2,928,661 | 3/1960 | Mac Laren | 261/87 |
| 2,987,186 | 6/1961 | Burgoon et al. | 210/197 |
| 3,207,314 | 9/1965 | Pearson | 210/195 |
| 3,680,704 | 8/1972 | Schaefer | 210/170 |
| 3,681,236 | 8/1972 | Bergles et al. | 210/195 |

Primary Examiner—Charles N. Hart
Assistant Examiner—Peter A. Hruskoci
Attorney, Agent, or Firm—William W. Haefliger

[57] ABSTRACT

Odor suppression in a septic tank sewage system involves reception of sewage in a septic tank wherein solids are allowed to settle; receiving liquids discharging from the septic tank into an enclosed aeration zone outside the septic tank; agitating the liquids in the aeration zone and delivering a stream of air into the liquids being agitated; and draining aerated liquid from that zone, these and other steps are carried out in a particular manner, of unusual advantage.

1 Claim, 6 Drawing Figures

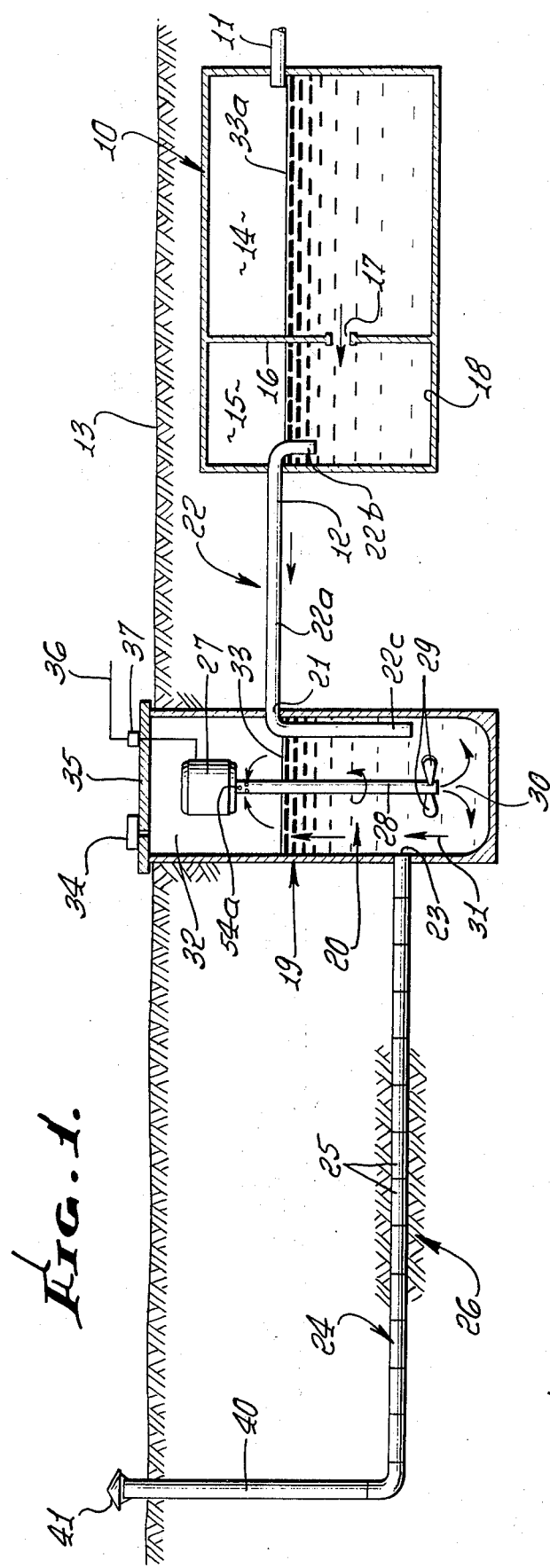
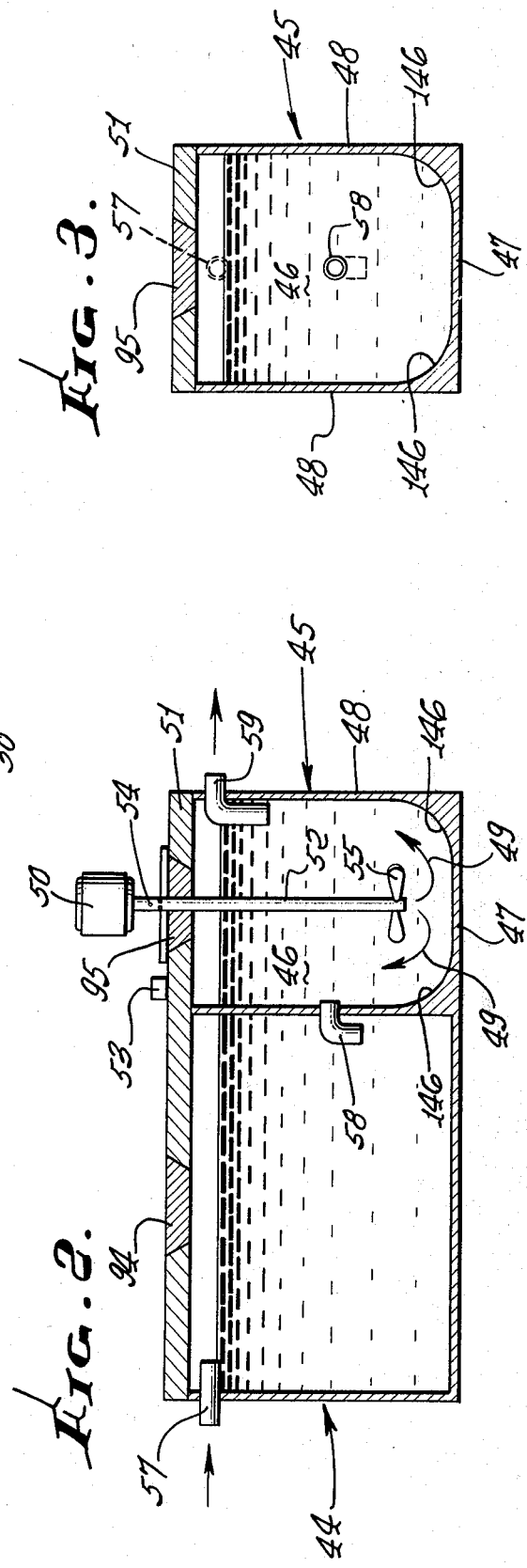

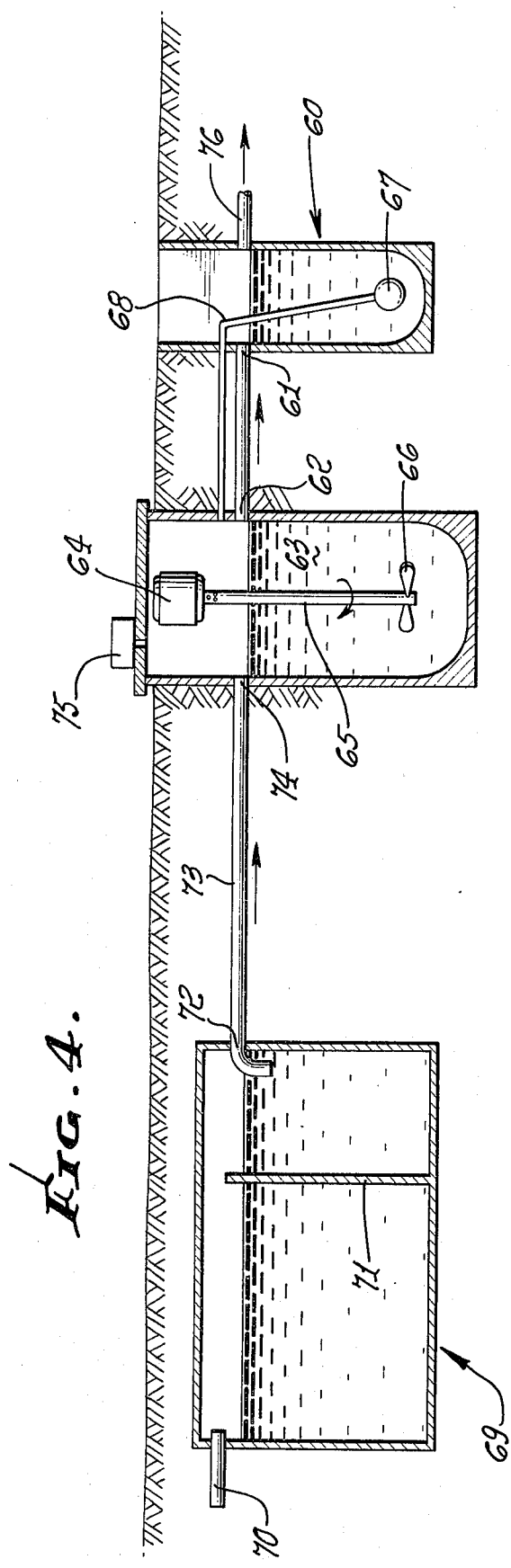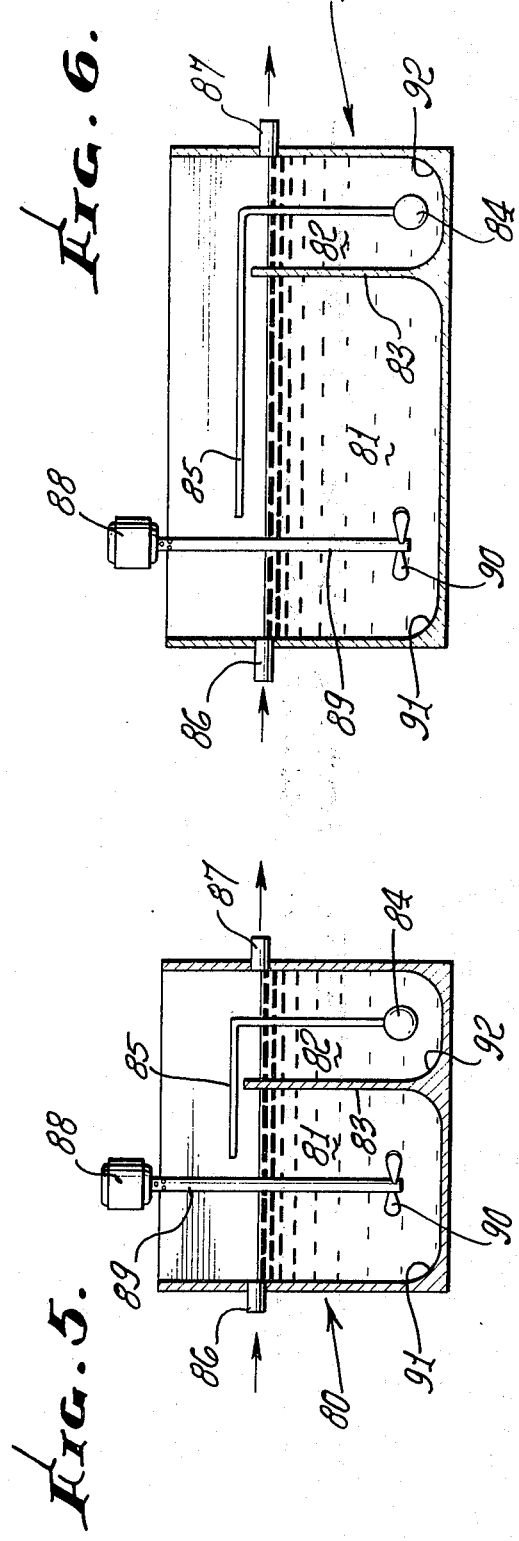

AERATED SEWERAGE DISPOSAL

This is a continuation of application Ser. No. 335,029, filed Feb. 23, 1973 now abandoned.

BACKGROUND OF THE INVENTION

This invention relates generally to the aeration of sewage systems, and more particularly concerns aeration of septic tank and associated drainage systems.

A recurrent problem in septic tank installations concerns the suppression of objectionable odor. It is found that such odor is typically generated in the liquids draining from septic tanks, as for example to and from leach lines. Another problem concerns the tendency for drainage from septic tanks to become interrupted, as for example may be caused by clogging of leach lines. Overflow of septic tanks can then occur, and the problem of odor is aggravated.

SUMMARY OF THE INVENTION

It is a major object of the invention to provide an apparatus to overcome the above as well as other problems associated with the use and operation of septic tank installations. Basically, the apparatus of the invention involves a system for receiving sewage in a vented septic tank and allowing settling of solids therein; receiving liquids discharging from the septic tank into an enclosed aeration zone outside the septic tank; agitating the liquids in the aeration zone and delivering a stream of air into the liquids being agitated; and draining aerated liquid from that zone. Accordingly, inasmuch as it is the liquids and not the solids that are being aerated, odor can be effectively suppressed.

Additionally, air issuing from the agitated liquids in the aeration zone or compartment may be collected and recirculated back into the agitated liquid and at the locus of rotary agitation, and the aeration zone may be maintained vented, as will be seen. Further, a clarifying zone may be provided to receive liquids from the aeration zone, some of the liquid in the clarifying zone being returned to the aeration zone, and clear, odorless liquid draining from the clarifying zone may be distributed for percolation.

In addition, a rotary agitator is typically located in the aeration compartment at a depth to agitate liquids therein, and means to rotate the agitator may advantageously comprise a motor drive above liquids level and a hollow tube extending vertically between the drive and agitator to be rotated for rotating the agitator and also supply air to the reduced pressure locus at the agitator for flow into and mixing with the liquids. Further, the aeration compartment may have rounded or fileted lower corners to aid in the liquids flow and liquids-air mixing process, as will be seen.

These and other objects and advantages of the invention, as well as the details of illustrative embodiments, will be more fully understood from the following description and drawings, in which:

DRAWING DESCRIPTION

FIG. 1 is an elevation showing an aerated drain line;

FIGS. 2 and 3 are side and end views, respectively, of an aerated septic tank;

FIG. 4 is a side elevation showing a clear water septic tank connected with a standard septic tank; and FIGS. 5 and 6 are elevations showing modified aerated compartments.

DETAILED DESCRIPTION

In FIG. 1, an underground septic tank 10 has a sewage inlet 11 and a liquids outlet 12, ground surface level being indicated at 13. The tank 10, which is closed except for said inlet and outlet, may comprise first and second compartments 14 and 15 separated by a baffle or wall 16 which contains an opening 17 above tank bottom level 18 to pass liquids to compartment 15. Accordingly, sludge collects in compartment 14 below the level of opening 17, and principally liquids collect in compartment 15.

Separated laterally from tank 10 is an aerated tank 19 defining an aeration compartment 20 having an inlet 21 located to receive liquids from the septic tank discharge outlet 12, as via piping 22. The latter has a horizontal stretch 22a between the tanks, a vertical riser 22b in compartment 15 and a vertical discharge extent 22c in the aerated compartment 20. The compartment 20 also has an aerated liquids outlet at 23 leading, for example, to a leach line 24 from which the aerated liquids percolate downwardly via perforations in or between leach line pipe lengths 25, into the earth or represented at 26.

In accordance with an important aspect of the invention, a rotary agitator is located in the aeration compartment 20 at a depth to agitate liquids therein, and means is provided to rotate the agitator and to conduct air downwardly into the agitated liquid. Also, the aeration compartment has vent means to pass air between the interior and exterior of that compartment. In the example, the referenced means may advantageously comprise an electric motor drive 27 and an upright tubular shaft 28 projecting within the interior of the compartment 20 and coupling the drive to the agitator shown in the form of blades 29 on the lower end of the shaft. The rotating shaft 28 is located to receive air at ports 54a and conduct air downwardly to discharge into the agitated liquids, and such air flow is induced by virtue of the low pressure created in the liquid at 30 centrally adjacent the blade roots, by virtue of blade rotation. In other words, the agitator is rotated at a speed such that downwardly induced air flow will occur, the air then circulating within the liquids to aerate them and reduce or eliminate odor. Such circulation is indicated by arrows 31.

Further, the air emerging into space 32 above the surface 33 of liquid in the compartment 20 is recirculated into the tube 28 for downward flow as described. An air vent is provided at 34 in a removable lid or cap 35 for tank 19, to pass air between the interior and exterior of the compartment 20, thereby to maintain a sufficient supply of oxygen in the circulating air 31, for aeration of liquids to remove odor. Electrical power may be supplied to the motor 27 via a like 36 and control or timer 37 to operate the motor intermittently, as for example between 10 and 20 minutes each hour, this being found sufficient under most conditions. Merely as illustrative, tank 19 may be cylindrical and have a diameter of around 3 feet.

It is also found that, for successful odor elimination, the closed septic tank 10 should have sufficiently greater volume than the aeration compartment that more than 50% of the sewerage solids, i.e. sludge, remain trapped in the septic tank. Note that the volumes under consideration are those below the liquid levels 33 in compartment 20 and 33a in the septic tank. The leach line 24 is also vented as via riser 40 and air vent 41 above ground, for aeration of that line to prevent odor. Desired aeration in compartment 20 is found to optimize drainage via the leach line and into the earth and to minimize clogging of the formation 26, the liquids flowing to the leach line being found to be clear and virtually odorless under proper operating conditions.

The modification seen in FIGS. 2 and 3 is like FIG. 1, with certain exceptions. For example, the septic tank 44 has no partition therein, and lies adjacent the tank 45 defining the aeration compartment 46. The latter has rounded lower corners at 146 between the bottom and side walls 47 and 48 to guide the flow of agitated liquid in upward paths indicated by arrows 49. Also, the motor drive 50 is located above cover plate 51, with tube 52 projecting downwardly within the compartment 46. An air vent 53 passes air from the tank interior to the exterior, and intake ports 54 in the tube pass air into the tube for introduction to the liquids at the "eye" of the agitator 55. Tank 44 has inlet and outlet ports at 57 and 58, and the compartment 46 has a clear liquids outlet 59 leading to a leach line or dry well system. Tank 44 is not vented to tank 46. Note caps 94 and 95.

The modification seen in FIG. 4 is like the FIG. 1 system, with certain exceptions. For example, an additional clarifying tank 60 is provided to have an inlet 61 connected with the outlet 62 of the aerated compartment 63, the latter containing a motor 64, vertical tube 65 and agitator 66 as before. Clean liquid flowing into tank 60 is subjected, in part, to recirculation to compartment 63 as via a pump 67 and return line 68, thereby further clarifying the liquid due to additional aeration in compartment 63. A standard septic tank 69 has an inlet 70, vertical baffle 71 (corresponding in function to wall 16 in FIG. 1), and liquids outlet 72 connected via line 73 with the inlet 74 to compartment 63. The latter is vented at 75. The outlet 76 from tank 60 flows clear liquid to a leach line or dry well system. Relative sizes of the tanks 69, 60 and compartment 63 are listed below, in gallons, as examples:

| Tank 69 | Compartment 63 | Tank 60 |
|---------|----------------|---------|
| 1,000   | 500            | 160     |
| 1,200   | 600            | 180     |
| 1,500   | 700            | 200     |

FIGS. 5 and 6 show combined forms of the aeration compartment and clarifying tank, as referred to. In FIG. 5 a square tank 80 defines an aeration compartment 81 and a clarifying compartment 82 separated by a vertical baffle or weir 83. A pump 84 and return line 85 returns some of the clarified liquid to compartment 81. Inlet and outlet ports appear at 86 and 87, and a motor, air tube and agitator appear at 88–90. Note the rounded corners 91 and 92. In FIG. 6 a similar tank 100 is rectangular in form instead of square, the elements otherwise bearing the same identifying numbers as in FIG. 5.

I claim:
1. In an aerated sewage disposal system, the combination comprising
  a. a septic tank having a sewage inlet and a liquids discharge outlet,
  b. an enclosed aeration compartment having an inlet located to directly receive liquids from the septic tank discharge outlet, and an aerated liquids outlet, the compartment having a bottom wall, side wall structure, and rounded corners extending between the bottom wall and side wall structure,
  c. a rotary agitator located in the aeration compartment at a depth to agitate and flow liquids downwardly in said compartment, and a tubular shaft extending downwardly to the approximate level of the agitator to carry and to rotate said agitator and to conduct air downwardly into the downwardly flowing agitated liquid, the tubular shaft having an air outlet proximate the agitator depth in said compartment, a motor connected with the tubular shaft at its upper end to rotate same, said rounded corners being located downwardly and laterally of the agitator in sufficiently close relation thereto to turn the air containing flowing liquid upwardly along said side wall structure,
  d. said aeration compartment having vent means to pass air between the interior and exterior of the compartment, and
  e. there being liquids in said tank and compartment, and said tank and compartment having liquid outlets, the volume of sewage and liquid in the septic tank when filled to the level of its outlet exceeding the volume of sewage and liquid in the compartment when filled to the level of its outlet and more than 50% of the sewage solids being trapped in the tank,
  f. there being control means connected with the motor to operate the motor intermittently with substantially greater off time than on time, and
  g. there being an additional tank having an inlet connected with the compartment outlet, and an outlet to which a leach line is connected, and means including a pump to effect return of aerated liquids from said additional tank to said compartment, said additional tank being substantially smaller than each of the septic tank and compartment

* * * * *